United States Patent [19]

Cartier

[11] 4,359,658
[45] Nov. 16, 1982

[54] PRESTRESSED PIEZOELECTRIC ACCELEROMETER

[76] Inventor: Jean Cartier, 1, rue de Midori, Les Loges en Josas, France, 78350

[21] Appl. No.: 119,540

[22] Filed: Feb. 7, 1980

[30] Foreign Application Priority Data

Feb. 9, 1979 [FR] France ............................ 79 03372

[51] Int. Cl.$^3$ .......................................... H01L 41/08
[52] U.S. Cl. ................................................ 310/329
[58] Field of Search ....................................... 310/329

[56] References Cited

U.S. PATENT DOCUMENTS

| | | | |
|---|---|---|---|
| 3,075,099 | 1/1963 | Shoor | 310/329 |
| 3,206,626 | 9/1965 | Burley | 310/329 |
| 3,229,128 | 1/1966 | Faulk | 310/329 |
| 3,233,465 | 2/1966 | Tolliver | 310/329 X |
| 3,389,276 | 6/1968 | Gradin et al. | 310/329 X |
| 4,104,921 | 8/1978 | Nissl | 310/329 X |

FOREIGN PATENT DOCUMENTS 1229103 3/1960 France.

Primary Examiner—Mark O. Budd
Attorney, Agent, or Firm—Lewis H. Eslinger

[57] ABSTRACT

Accelerometer of the spring-mass type comprising, in a housing, a balanced vibrating mass, a spring constituted by at least one hollow piezoelectric element situated between the mass and the housing, as well as a fastening element traversing the mass and secured to the housing.

In addition, a prestressing element situated between the fastening element and a recess provided in the mass urges the latter towards the housing. The piezoelectric element surrounding the mass is then compressed. The point of application of the prestressing force and the center of gravity of the mass are in the same median plane of the piezoelectric spring, which plane is transversal and perpendicular to the axis of the housing.

12 Claims, 6 Drawing Figures

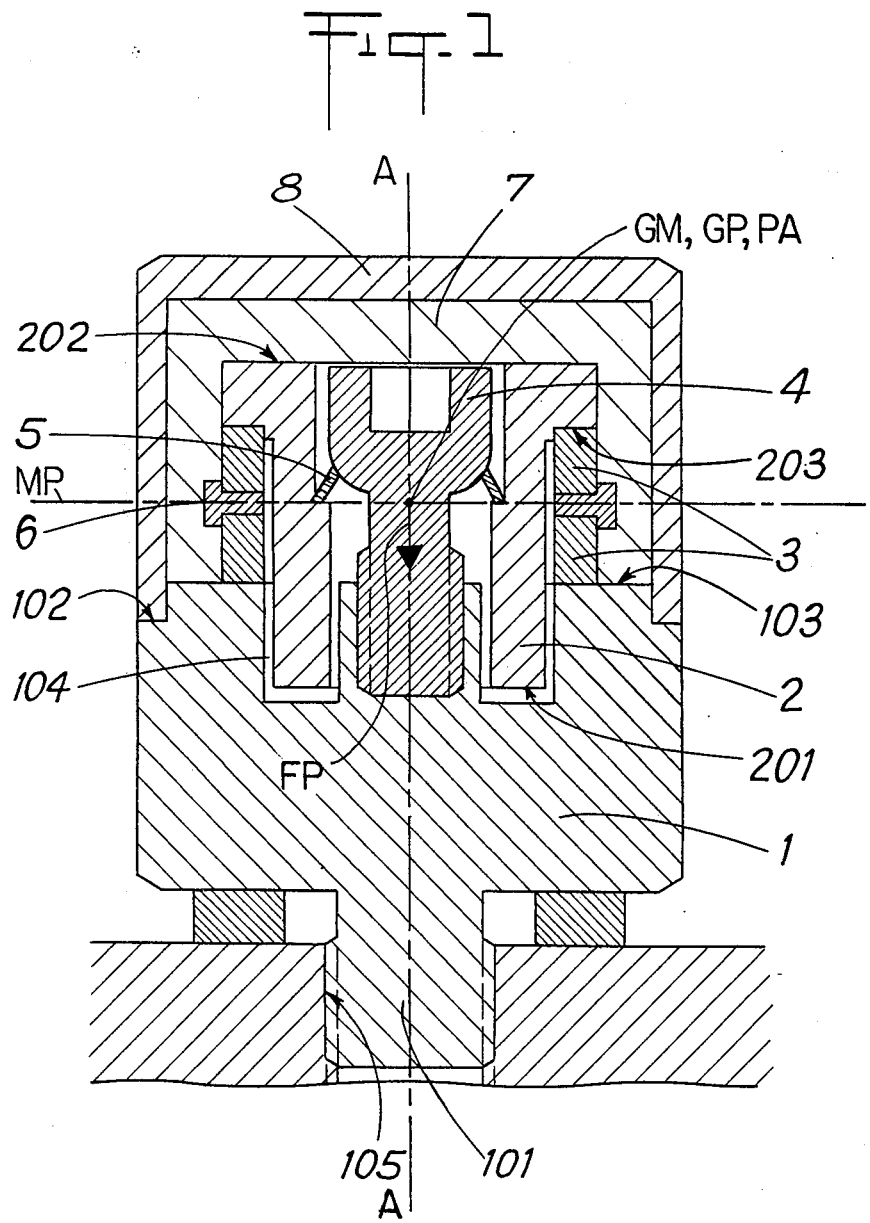

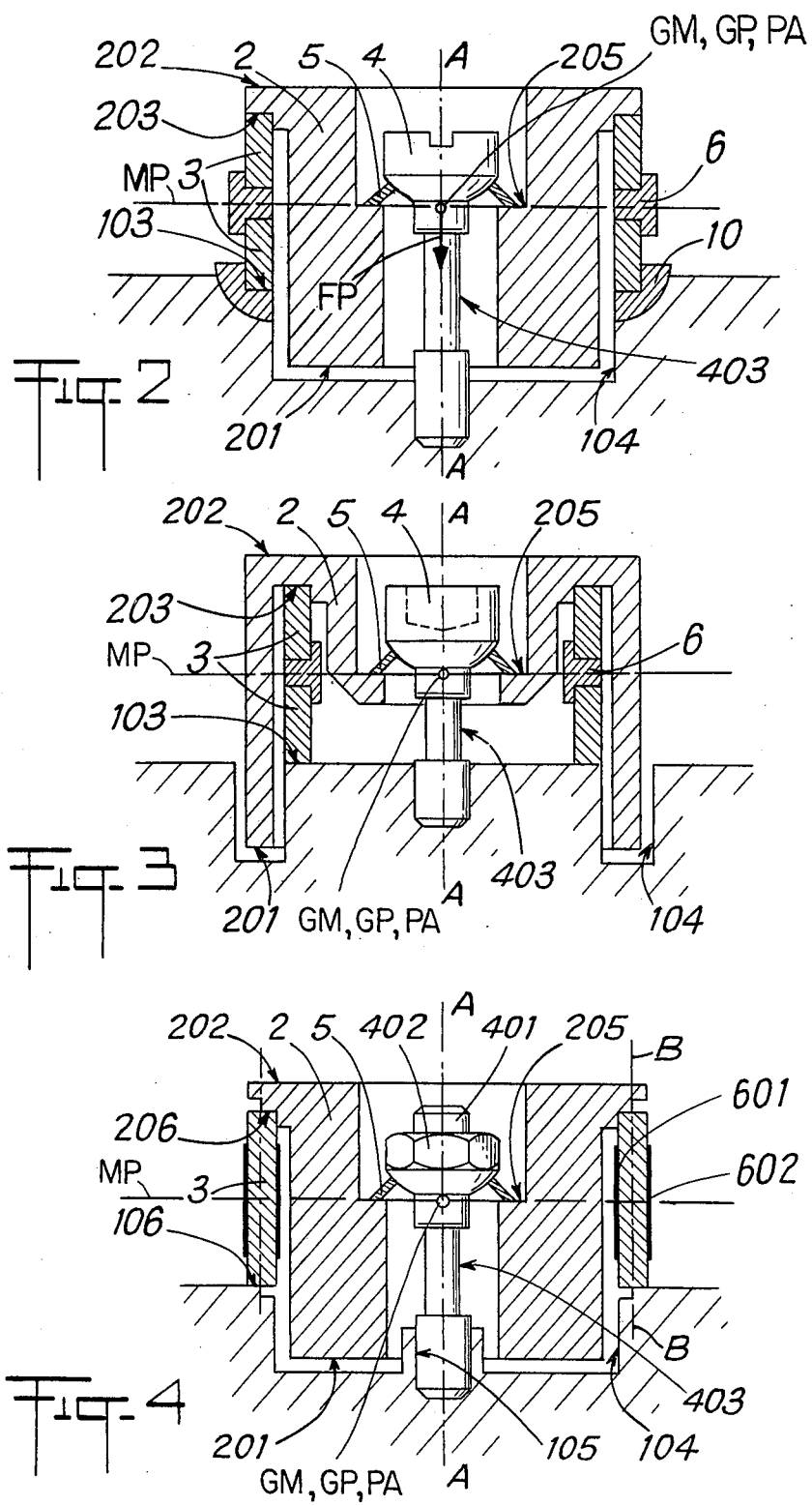

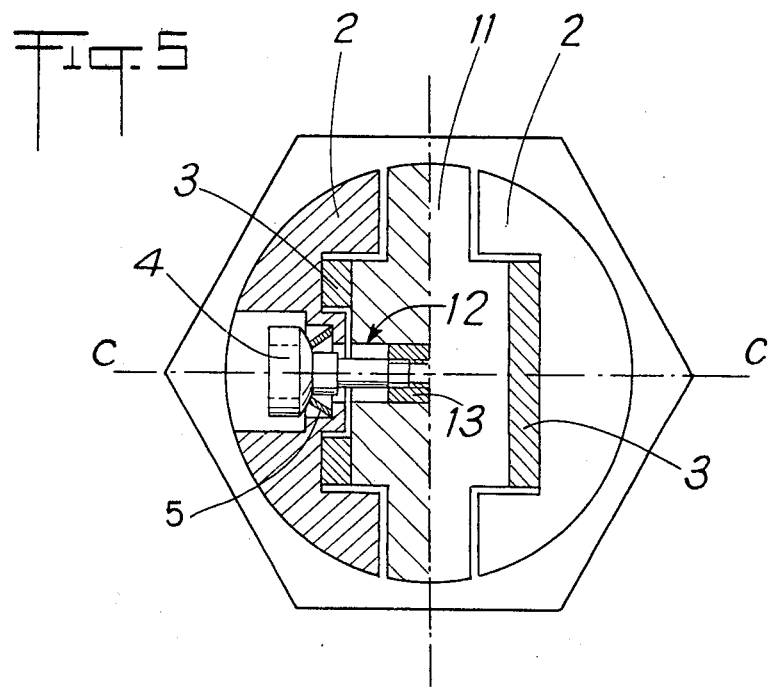
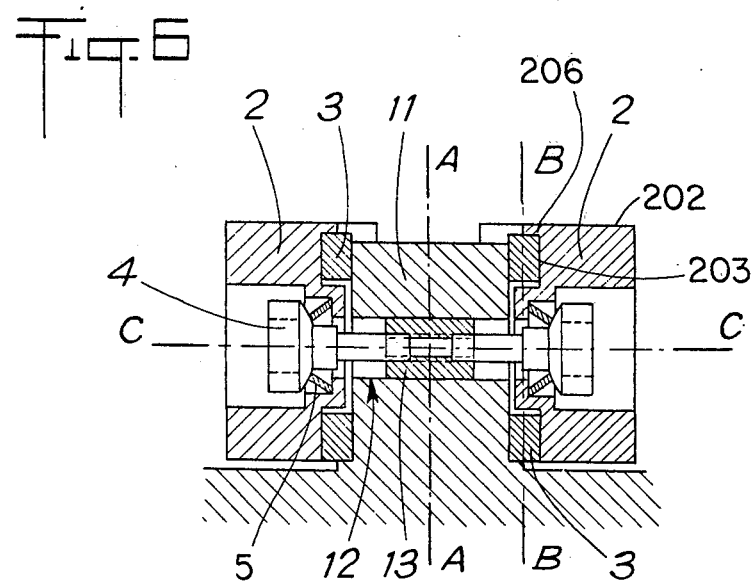

PRESTRESSED PIEZOELECTRIC ACCELEROMETER

The present invention relates to an accelerometer device of the spring-mass type comprising, in a housing, a hollowed vibrating mass having a recess and being statically and dynamically balanced, a spring constituted by at least one hollow piezoelectric element interposed between the mass and the housing as well as a fastening element mounted in the housing, traversing the hollow piezoelectric element and abutting against a shoulder of the recess of the vibrating mass.

Such known accelerometer devices are used more and more to detect or to measure the vibrations or shocks to which certain mechanical parts are subjected, parts used for example in aeronautics, in the motorcar industry, in iron-works, etc.

In these accelerometer devices of the spring-mass type, the piezoelectric active element, which can be made of ceramic for example, ensures the force-voltage conversion.

The housing of the accelerometer device comprises a fastening member with which the whole device assembly is secured to the structure of which the vibrations or shocks are to be measured.

The theory shows that for any given spring-mass system, a suitable pulsation or vibration exists and that, depending on the pulsation of the vibratory movement to which the said system is subjected, the output signal that is obtained is proportional either to the acceleration exerted on the vibrating measuring mass, or to the relative position of the latter with respect to the supporting housing. In this latter case, the electric output voltage directly indicates the position of the vibrating mass with respect to the support housing.

But in certain cases, it has proved necessary to remove from the output signal the interfering signals that are due to the presence of various influential parameters, the most important ones being the transverse error, and the surrounding conditions: temperature, thermal shocks, acoustic noises ....

The sensitivity of such an accelerometer device is therefore dependent on the selection of the dimensions of the measuring vibrating mass, of the stiffness of the spring (piezoelectric element) and of the force-voltage conversion coefficient of the ceramics used to produce the piezoelectric spring. As a result of such selection a vibration frequency is obtained which is the system's own frequency, as well as a voltage range for the output signals, and an acceleration range which can be measured by the accelerometer device.

The accelerometer devices should be able to accurately measure the level of the vibration to which they are subjected, and this along a special axis of sensitivity selected as measuring direction, i.e. the projection of the level of the vibratory motion onto the said axis. The precise knowledge of the said axis of sensitivity makes it necessary for the vibrating measuring mass-piezoelectric spring system, to be designed with only one degree of freedom, which implies a very good guiding of the vibrating mass and its firm fixation to the support housing of the accelerometer device.

The accurate guiding of the vibrating mass necessitates the machining of the guiding parts with a very strict tolerance. Moreover, too great a stress applied on the piezoelectric element through the vibrating mass to ensure the solid fixation of the latter, could cause a depolarisation of the piezoelectric spring. Such a stress appears for example when the accelerometer device is subjected to temperature variations which in turn involve expansion variations in the different elements of the said device and which, considering the modulus of elasticity of the vibrating mass fastening member, introduce force variations to which the piezoelectric spring is subjected. If the frequency at which these temperature variations occur is included in the range of vibrations to which the accelerometer device is subjected, the stress variations are converted into an interfering signal which disturbs the measured picked-up signal.

It is the object of the present invention to produce an accelerometer device of the type mentioned initially, and in which the aforesaid disadvantages are either eliminated completely or at least considerably reduced, and permitting to obtain accurate measurement results.

With an accelerometer device of the aforesaid type, this object is reached according to the invention, due to the fact that the said device further comprises a prestress elastic element situated in the recess of the vibrating mass between a shoulder of the said mass and the fastening member, and that the position of the prestressing element with respect to the mass is such that the point of application of the prestressing force and the centre of gravity determined by the static and dynamic balancing of the vibrating mass are situated in the same median plane, of the piezoelectric element, which plane is transversal and perpendicular to the axis of the housing.

Due to this design, the vibrating mass is guided correctly and the variations of the prestressing force are reduced to a minimum.

It is true that the author of the present invention (see French Pat. No. 1 229 103) has already proposed to use an annular spring situated level with the centre of gravity of the vibrating mass and also resting on the fastening means. But, in this known case, the vibrating mass is solid and the fastening means are in resting contact not only on the support housing, but also on the cover of said housing, thus entailing an increase of the sensitivity to acoustic noises surrounding the accelerometer device, and by microphonism, an increase in indesirable interfering signals. To limit the sensitivity to acoustic noises, it has proved necessary to provide rigid housings, this resulting in the device being very heavy and bulky. Moreover, with the known device it is impossible for the centres of gravity of the vibrating mass and of the piezoelectric spring to be coincident.

In order to obtain a very compact accelerometer device, it is advantageous for the element of the hollow piezoelectric spring to be cylinder-shaped and to surround part of the grooved vibrating mass, and also for the mutual arrangement of the vibrating mass and of the elements of the piezoelectric spring to be such that their centres of gravity are in the same median plane of the piezoelectric spring, which plane is transversal and perpendicular to the axis of the housing and, preferably, that said centres of gravity coincide with the centre of gravity of the balanced vibrating mass. In some special cases, it is advantageous for the elements of the hollow cylindrical piezo-electric spring to be surrounded at least partly, in skirt-like manner, by a part of the grooved vibrating mass, the mutual arrangement of the vibrating mass and of the elements of the piezoelectric spring being such that their centres of gravity are in the same median plane of the piezoelectric spring, which plane is transversal and perpendicular to the axis of the housing and, preferably, that said centres of gravity coincide with the centre of gravity of the balanced vibrating mass.

To make contact easier between the grooved vibrating mass and the upper part of the hollow piezoelectric elements, the vibrating mass is provided, on its side remote from the housing but facing the latter, with an outer or inner should which serves as a contact face on a piezoelectric element applied on the other side of the said housing. In order to bring the centres of gravity of the vibrating mass and of the piezoelectric spring closer together or to coincide with one another, it is advantageous for one end of the vibrating mass to be housed in a recess of the housing, which recess is situated beneath the lowest end of the cylindrical piezoelectric elements. This recess can be annular shaped and can be found either on the outside or on the inside of the axial projection of the piezoelectric elements.

In order to ensure an accurate alignment of the piezoelectric elements on the axis of sensitivity coinciding with that of the fastening means and in order to ensure the accurate guiding of the vibrating mass along said axis, it is advantageous for one of the ends of the piezoelectric element to be in resting contact on the housing by way of a spherical ball which is cut to allow the passage of the fastening element and, if necessary, of part of the vibrating mass, which spherical ball has a spherical surface the center of which is situated on the joint axis of the housing and of the fastening element, and resting on a spherical cavity of the housing, the diameter of which spherical cavity is identical to the diameter of the said spherical ball.

In this context, the prestressing element will conveniently comprise at least one end shaped as a spherical cavity or ball, cooperating with a spherical ball or cavity of the same shape provided on the support face either of the inner shoulder of the vibrating mass, or of the outer shoulder of the fastening element, the centres of curvatures of these spherical ball and cavity being situated on the joint axis of the housing and of the fastening element.

The prestressing element is constituted by at least one truncated elastic washer.

In order to facilitate the securing of the vibrating mass on the support housing, it is advantageous for the fastening element to be constituted by a nut and a threaded rod which is either made fast with the housing by screwing, or made in one piece with said housing. In order to reduce the bad influence of the heat variations to a minimum, the fastening element is provided with a median part of smaller cross-section than that of the end parts, and of sufficient height for its thermal resistance to be equal to, or little different from that of the assembly consisting of the vibrating mass, the piezoelectric element or elements, and the material composing the prestressing element and the fastening member have expansion coefficient adapted to those of the mass-spring system so as to obtain a minium differential expansion.

According to another mode of operation, the vibrations to be measured instead of subjecting the piezoelectric element to crushing stresses between the vibrating mass and the support housing, appear as shearing stresses at the level of the piezoelectric element. To this end, the outer or inner shoulder of the vibrating mass comprises a face for partly supporting one end of the piezoelectric element and the housing comprises a face for partly supporting the other end of the said piezoelectric element, said two faces being offset with respect to one another so that the vibrating mass constitutes either the inner support or the outer support, and the housing constitutes respectively the outer support and the inner support, for the said piezoelectric element. The position of the electrodes should then be adapted to this new mode of operation, and this is the reason why, in the present case, the said electrodes are situated, one on the radially external peripheral surface, and the other on the radially internal peripheral surface of the piezoelectric element.

For the accelerometer device to operate in such a way as to measure the vibrations according to a shearing mode, another embodiment of the said accelerometer device is characterized in that it comprises two vibrating masses each being shaped as a cylindrical segment, the plane face of which is parallel to the axis of the housing, in that the said housing comprises a projecting middle part, so-called girder, provided with two parallel face supporting the corresponding plane face of the vibrating mass, in that a piezoelectric element in the shape of a grooved plate is clamped between the support face of the girder and the support face of one of the two vibrating masses, that the inner shoulder of the mass is milled so that the centre of gravity of the mass and the point of application of the prestressing force are always in the same median plane of the piezoelectric spring, which plane is transversal and perpendicular to the axis of the housing, and in that the two parallel contact faces are provided on the girder so that the centre of gravity of the piezoelectric element and the point of application of the prestressing force are in the same plane and preferably coincident, in that the girder comprises a bore perpendicular to the axis and to the parallel support faces of the housing and in that each piezoelectric element is clamped by means of the fastening element between the plane face of a vibrating mass and one of the support faces of the girder.

In the case of this particular embodiment of the accelerometer device, it is further provided that the upper end of the plane face of each vibrating mass is topped with a support shoulder facing the corresponding vibrating mass, that the width across the said support shoulders is less or at the most equal to half the shoulder of the plate-shaped piezoelectric element, and that one of the edges of the said piezoelectric element comes into abutment against the vibrating mass whilst the opposite edge comes into abutment against the support shoulder of the girder.

It is also advantageous for the bore of the girder to be lined with a thermal and electrical insulation tube traversing also and with play the recess of the piezoelectric element and partly penetrating the recess of the vibrating mass. The insulation tube can also be constituted by two screws which are screwed in one part of the said tube and which, by way of their heads, urge the elastic prestressing element towards the girder of the housing.

The present invention will be more readily understood on reading the following description with reference to the accompanying drawings, in which:

FIG. 1 is a cross-sectional view of one complete embodiment of the assembly according to the invention, mounted on a member, FIG. 2 is a cross-sectional view of a part of the assembly according to another embodiment, FIG. 3 is a cross-sectional view of a part of the assembly according to another embodiment;

FIG. 5 is a half view of a half cross-section of one embodiment with two vibrating masses;

FIG. 6 is a cross-sectional view of a part of yet another embodiment with two vibrating masses.

According to the embodiments shown by way of example and non-restrictively in FIGS. 1 and 2, there is seen a support housing 1 in which is engaged part of a vibrating mass 2. A piezoelectric element 3, hollow and cylindrical, surrounds the vibrating mass 2 and is clamped between same and the housing 1. The whole assembly is held together by a fastening member 4. A prestressing member 5 is situated between the fastening member 4 and the vibrating mass 2. The piezoelectric element 3 is also provided with a central electrode 6. The device is filled with a substance 7 of the silicone family. A cover 8 sealingly covers the whole assembly.

In the embodiment shown in FIG. 3, the hollow and cylindrical piezoelectric element 3 is located inside the vibrating mass 2 so as to be at least partly surrounded by said mass in a skirt-like manner.

In any case, the centers of gravity GM, GP of the vibrating mass 2 and that of the piezoelectric element 3 are always in the same median plane MP of the piezoelectric element, which plane is transverse and perpendicular to the axis A-M of the housing, and preferably said centres of gravity are coincident.

The support housing 1 appears on the outside as a right prism of hexagonal cross-section with a threaded lug 101 on its lowest face so that it is easily fitted on the member to be checked by means of a wrench. At its upper part, there is provided a concentric, circular peripheral shoulder 102 which shoulder will subsequently receive the cover 8. The piezoelectric element 3 rests on the upper plane face 103 of the support housing 1, a joint to be described hereinafter being in some cases interposed between element 3 and said face 103.

Part of the vibrating mass 2 sinks into the support housing 1. To this effect, an annular groove recess 104, concentric and of rectangular cross-section is provided in the upper face 103 of the support housing 1. The depth of said groove 104 is such that the centre of gravity GM of the vibrating mass 2 and that GP of the piezoelectric element 3 are in the same plane MP and preferably coicident. The lowest part 201 of the vibrating mass 2 is contained in the groove 104 in such a way as to touch neither the bottom nor the sides thereof.

The vibrating mass 2 is provided on the side of its upper part 202, and beneath the remotest face of the support housing 1, with a shoulder of which the face 203 is directed towards the upper face 103 of the support housing 1, which shoulder is internal (inner shoulder) or external (outer shoulder) depending on whether the piezoelectric element 3 surrounds (FIGS. 1,2) or is surrounded (FIG. 3) by the vibrating mass 2. In the case where the piezoelectric element 3 works in compression, the faces 103 and 203 should be parallel and extend over the whole surface of the cross-section of the piezoelectric element 3. For this condition to be met, whatever the machining and the tolerance imposed, a joint of the ball and socket type is preferably fitted (as shown in FIG. 2 only) the centre of which joint is situated on the joint axis of the support housing 1 and of the fastening element 4 between the piezoelectric element 3 and the housing support 1.

Said joint is arranged in the upper face 103 of the support housing 1, concentrically to the groove 104, in the angle formed by the upper face 103 and the outermost, or the innermost side wall, when the piezoelectric element 3 surrounds or is respectively surrounded by the vibrating mass 2. A ring or spherical ball 10 is provided with a plane face on which rests the piezoelectric element 3 and a spherical face which fits on and is joined to a complementary spherical surface or cavity of the same radius, formed by the said support housing 1. In these conditions, the ring 10 being hinged on the support housing 1 along a spherical surface, the piezoelectric element will be compressed between the constantly parallel faces 103 and 203. Such joint could, without departing from the invention, be provided at the level of the face 203 of the shoulder of the vibrating mass 2.

The fastening element 4 can, for example, be a screw. Through the action of the prestressing element 5, the vibrating mass is urged towards the support housing 1. The shank of the screw is screwed in a tapped hole 105 provided co-axially to the support housing 1. As illustrated in FIG. 4, it is also possible to use a screwed spindle 401 and a nut 402, the shank of the spindle being then anchored in the support housing 1 by welding, gluing or any other known means, in the hole 105. The head of the fastening screw 4, or the nut 402, and the prestressing element 5 are housed in a recess of the vibrating mass 2, provided co-axially and in the upper face of the said vibrating mass 2.

The radius of gyration of the vibrating mass 2 is defined by the following formula:

$$R = \sqrt{\frac{I}{S}}$$

wherein I designates the moment of inertia of the radial section of the vibrating mass with respect to an axis orthogonal to the plane of the said section and traversing the centre of gravity, and S designates the area of the said radial section.

The bottom 205 of the recess is situated at a depth such that the point of application PA of the resultant of the prestressing force FP exerted by the prestressing element 5 and the centre of gravity 6M of the statically and dynamically balanced vibrating mass 2 are coincident, and that the mean radius of the piezoelectric element 3 and the radius of gyration of the vibrating mass 2 are preferably equal.

In order that the prestressing force be exerted in parallel to the joint axis A—A of the support housing 1 and of the fastening element 4 and that it be preferably mingled therewith, a spherical joint of the ball and socket type is disposed between the lower face of the screw head 4 or of the nut 402 and the upper face of the fastening screw 4 has, for example, a convex spherical shape of which the centre of curvature is situated on an axis of symmetry of the screw, and the upper face of the prestressing element 5 has a complementary spherical or circular shape, or vice versa.

The lower face of the prestressing element 5 rests on the bottom 205 of the recess of the vibrating mass 2. There is then defined only one priviledged direction, which known direction is obtained with accuracy, even though the machining tolerances are broad; that is the direction along which the vibratory motion will be measured.

It would be equally possible to provide such a ball and socket type spherical joint on the bottom 205 of the recess of the vibrating mass 2, in which case the prestressing element would be abutting against a lower face of the fastening element 4 which would be plane.

To lessen the sensitivity to transitory thermal phenomena, it is necessary to balance the thermal resistances and the coefficient of expansion, seeing that considering the heterogeneous structure of the stackings: support housing 1, piezoelectric element 3, vibrating mass 2 and support housing 1, fastening element 4, prestressing element 5, vibrating mass 2, it would be illusive to try and balance the thermal capacities. The thermal resistances, on the contrary, can be very much increased by depositing, according to a known process, an insulating material the effect of which is to prevent the appearance of transients and to reject them outside the service area of measurements. A large number of materials can fulfill these requirements and can be used by spraying with a plasma gun, by welding, by cementing or any other known process.

But in the stacking, the fastening element 4 appears as a real thermal short-circuit between the support housing 1 and the vibrating mass 2. To increase its thermal resistance, a constriction 403 is machined along its largest dimension. Its smallest cross-section remains compatible with the material strength calculations and its length is such that its own strength is increased.

In order to have a very small differential expansion, the material making up the fastening element 4, screw or screwed spindle may be titanium, tungstene or any known alloys.

In addition, the extra force resulting from the said expansion will be weaker since it is proportional to the constant of elasticity of the prestressing element 5 which may be between 10 and 100 times weaker than the modulus of elasticity of the material selected for the fastening element 4. Said prestressing element 5 is, for example, a deformable elastic truncated washer, cut from a material known of any one skilled in the art, since commonly used in mechanical engineering.

According to the embodiment shown in FIG. 4, the vibrations to be measured have resulted in shearing stresses on the piezoelectric element 3. Indeed, the face 203 of the shoulder of the vibrating mass 2 instead of extending over the whole surface of the said element 3 is now in contact with only a surface 206 which is at the most equal to half the precedingly contacting surface. In the same way, the face 103 of the support housing 1, or the plane face of the ring 10 ensuring the ball and socket type spherical joint is now in contact with only a surface 106 which is also at the most equal to half the surface precedingly in contact with the piezoelectric element 3.

The two surfaces 106 and 206 are offset and situated on either side of an axis of symmetry B—B dividing in half the radial thickness of the piezoelectric element 3. This is obtained for example by cutting off the shoulder of the vibrating mass 2 over a small thickness and over a width permitting to reduce the face 203 in the aforesaid proportions. Also, a very shallow groove, concentric and immediately adjacent to the groove 104 of the support housing 1 is provided on the face 103. The piezoelectric element could similarly be subjected to a shearing stress by reversing the relative position of the surface 106 and 206 in question, with respect of the axis of symmetry B—B traversing the radial thickness of the piezoelectric element 3. It is further possible to provide a male section on the face 203 of the shoulder of the vibrating mass 2, and the corresponding female section on the face 103 of the support housing. It is then necessary to adapt the disposition of the electrodes to this new mode of operation, and for this reason a fine layer of silver or nickel or any other conducting material is deposited by vacuum-plating, or any other known means, on the radially internal peripheral surface 601 and on the radially external peripheral surface 602 of the piezoelectric element 3.

According to the embodiment illustrated in a half-view of a half cross-section in FIG. 5, the accelerometer device is provided with two vibrating masses 2, each one having the shape of a cylindrical segment, the plane face of which is parallel to the axis A—A of the support housing 1. Their overall C-shape partly encloses the middle integral part projecting from the support housing 1, and designated as a girder 11, so that the centre of gravity of the vibrating mass 2 and that of the piezoelectric element 3 are always in the same median plane of the piezoelectric spring which plane is transversal and perpendicular to the axis of the housing and are preferably coincident.

The girder 11 is provided with two parallel support faces. The piezoelectric element 3 is shaped as a grooved or recessed plate and is clamped between a plane support face of the girder 11 and the plane face of one of the vibrating masses 2. A bore 12 crosses right through the girder 11 co-axially to an axis C—C traversing the middle of the plane support faces and orthogonally to their surface area. The whole assembly is held together by the fastening element 4 which is screwed in an insulating tube 13 fitting in the bore 12 and which is tapped in its middle in order to receive the threaded shank of the fastening element 4.

According to another embodiment illustrated in FIG. 6, there are always two vibrating masses 2, but this time the piezoelectric element is no longer subjected to compression forces but to shearing stresses. Indeed, the upper end of the plane face of each vibrating mass 2 is topped with a shoulder facing the girder 11, whereas the lower end of each plane support face of the girder 11 has a shoulder facing the vibrating mass 2 which faces it. The width across each shoulder rests on a thickness at the most equal to that of the piezoelectric element 3 in the radial direction. Thus, the latter, which is shaped as a grooved plate is found to be subjected to shearing stresses exerted between its upper edge in contact with the shoulder of the vibrating mass 2 and its lower end in contact with the shoulder of the girder 11, on either side of an axis of symmetry B—B which is parallel to the axis of the support housing and traverses the thickness of the piezoelectric element 3 in the middle. There is always provided an insulating tube 13, made of a known thermal and electric insulation material or of a conducting material but coated with a layer of insulating material, which tube is housed in the bore 12 of the girder 1, and in which are screwed the fastening elements 4. Said fastening elements 4 can be a screw, the body of which crosses through the first vibrating mass 2, the girder 11 and the second vibrating mass 2 whereas its threaded shank is screwed in a nut housed in the second vibrating mass 2. In this particular case, the insulating tube 13 is no longer tapped, but smooth.

What is claimed is:

1. An accelerometer device of the springmass type comprising, in a housing having an axis, a hollowed vibrating mass having a recess and being statically and dynamically balanced; spring means including hollow piezoelectric means interposed between the mass and the housing, and a fastening element mounted in the housing; and elastic prestressing means situated in the recess of the vibrating mass between a shoulder of said mass and the fastening element, and wherein the position of the prestressing means with respect to the mass is such that the point of application of the prestressing force and the center of gravity determined by the static and dynamic balancing of the vibrating mass are situated in the same median plane of the piezoelectric means, which plane is transverse and perpendicular to the axis of the housing.

2. An accelerometer device as claimed in claim 1, wherein said hollow piezoelectric means is of a cylindrical configuration and surrounds part of the hollowed vibrating mass, and also wherein the arrangement of the vibrating mass and of the piezoelectric means is such that their centres of gravity are in the same median plane of the piezoelectric means, which plane is transverse and perpendicular to the axis of the housing.

3. An accelerometer device as claimed in claim 1, wherein said hollow piezoelectric means is of a cylindrical configuration and is surrounded at least partly, in a skirt-like manner, by a part of the hollowed vibrating mass, and wherein the arrangement of the vibrating mass and of the piezoelectric means is such that their centres of gravity are in the same median plane of the piezoelectric means, which is transverse and perpendicular to the axis of the housing.

4. An accelerometer device as claimed in any one of claims 1 to 3, wherein the arrangement of the vibrating mass and the piezoelectric means is such that their centres of gravity are situated in the same transverse plane, are perpendicular to the axis of the housing, and are coincident.

5. An accelerometer device as claimed in any one of claims 1 to 3, wherein the vibrating mass is provided, on its side remote from the housing but facing the latter, with one of an outer and inner shoulder which serves as a contact face for said piezoelectric means which is applied against said housing.

6. An accelerometer device as claimed in any one of claims 1 to 3, wherein one end of the vibrating mass is housed in a recess of the housing, which latter recess is situated deneath the lowest end of the piezoelectric means.

7. An accelerometer device as claimed in any one of claims 1 to 3, wherein one of the ends of the piezoelectric means is in resting contact on the housing by way of a spherical ball which is cut to allow the passage of the fastening element, the latter having an axis coincident with the axis of the housing, which spherical ball has a spherical surface and the center of the spherical ball being situated on the joint axis of the housing and of the fastening element, and said spherical surface resting on a spherical cavity of the housing, the diameter of which spherical cavity is substantially identical to the diameter of said spherical ball.

8. An accelerometer device as claimed in any one of claims 1 to 3, wherein said fastening element has an axis coincident with the axis of said housing and has an outer shoulder with a support face, and wherein the prestressing means has at least one end thereof circularly shaped for cooperating with a convex shaped ball of the same circular shape and provided on an outer shoulder of the fastening element, the centres of curvatures of said convex shaped ball and said circular shaped end being situated on the joint axis of the housing and of the fastening element.

9. An accelerometer device as claimed in any one of claims 1 to 3, wherein the prestressing element is constituted by at least one truncated elastic washer.

10. An accelerometer device as claimed in any one of claims 1 to 3, wherein the fastening element is constituted by a nut and a threaded rod which is either made fast with the housing by screwing, or made in one piece with said housing.

11. An accelerometer device as claimed in any one of claims 1 to 3, wherein the fastening element is provided with end parts and a median part of smaller cross-section than that of the end parts and of sufficient height so that its thermal resistance is, at most, slightly different from that of the assembly comprised of the vibrating mass, the piezoelectric means, and the material composing the prestressing means, and the fastening element has an expansion coefficient adapted to those of the remainder of the device so as to obtain a minimum differential expansion.

12. An accelerometer device as claimed in any one of claims 1 to 3, wherein said piezoelectric means has an outer axis and wherein the vibrating mass includes an outer shoulder having a face for partly supporting one end of the piezoelectric means, and the housing comprises a face for partly supporting the other end of said piezoelectric means, said two faces being offset with respect to one another so that the vibrating mass constitutes an inner support, and the housing constitutes an outer support, for said piezoelectric means with respect to the axis of the piezoelectric means.

* * * * *